United States Patent [19]

Salicini

[11] 4,319,495
[45] Mar. 16, 1982

[54] COUPLING AND UNCOUPLING APPARATUS

[75] Inventor: Sandro Salicini, Bologna, Italy

[73] Assignee: Carle & Montanari S.p.A., Bologna, Italy

[21] Appl. No.: 141,680

[22] Filed: Apr. 18, 1980

[30] Foreign Application Priority Data

Apr. 27, 1979 [IT] Italy .................. 12568 A/79

[51] Int. Cl.³ .................. F16H 57/00; F16D 11/06
[52] U.S. Cl. .................. 74/405; 74/813 L; 192/89 A; 192/18 B
[58] Field of Search .................. 74/405, 813 L, 814; 192/33 R, 89 A, 18 R, 18 A, 18 B

[56] References Cited

U.S. PATENT DOCUMENTS

| | | | |
|---|---|---|---|
| 1,036,359 | 8/1912 | Slentz | 192/33 R |
| 1,652,704 | 12/1927 | Daly | 192/33 R |
| 2,251,306 | 8/1941 | Thompson | 192/18 B |
| 2,654,271 | 10/1953 | Pulman | 74/814 |
| 2,915,160 | 12/1959 | Schneider | 192/33 R |

FOREIGN PATENT DOCUMENTS

| | | | |
|---|---|---|---|
| 1141818 | 12/1962 | Fed. Rep. of Germany | 74/405 |
| 1052627 | 9/1953 | France | 192/33 R |
| 489888 | 1/1976 | U.S.S.R. | 192/33 R |

*Primary Examiner*—Lawrence J. Staab
*Attorney, Agent, or Firm*—Lowe, King, Price & Becker

[57] ABSTRACT

The apparatus for the in phase coupling and uncoupling of a kinematic mechanism with respect to another such mechanism to which a stepwise rotary movement is imparted, comprises a driving toothed gear to which the stepwise rotary movement is imparted; a driven toothed gear which is to be controlled and stopped as desired in phase with respect to said driving member; intermediate drive means connected between the driving member and the driven member and movable between a first condition in which the stepwise rotary movements of the driving member are transmitted to the driven member and a second condition in which the driven member is maintained stationary. The movement of the intermediate drive means is controlled by a rotary cam.

13 Claims, 2 Drawing Figures

COUPLING AND UNCOUPLING APPARATUS

SUMMARY OF THE INVENTION

The invention concerns an apparatus for in phase coupling and uncoupling of a kinematic mechanism with respect to another such mechanism to which a stepwise rotary movement is imparted.

Purely by way of example and therefore not by limitation it is to be noted that the apparatus in question can be effectively employed in processing machines of the intermittent type, for "in phase" stopping of the unit supplying, for example, confectionery wrapping material when no product arrives at the processing station and then for re-starting this unit in phase with the various operative members of the machine when the aforesaid negative condition ceases to exist.

At present, engaging and disengaging units are employed for this purpose, which are actuated by a suitable servo-control and provided with a brake which is generally mechanical and locks the driven mechanism in the correct angular position while this mechanis is inoperative. Apparatus of this kind have disadvantages in operation and require frequent maintenance and adjustment because of the presence of the aforesaid brake.

The invention aims to obviate these disadvantages by means of a device which has no brake, which requires no maintenance and adjustment because it has no parts subject to substantial wear, which is characterised by a relatively simple structure, and, lastly, is characterised by extremely precise operation.

The invention provides apparatus for the in phase coupling and uncoupling of a kinematic mechanism with respect to another such mechanism to which a stepwise rotary movement is imparted, the apparatus comprising:

a driving member to which the stepwise on intermittent rotary movement is imparted;

a driven member which is to be controlled and stopped as desired in phase with respect to said driving member;

drive or control means connected between the driving member and the driven member and movable between a first condition in which the stepwise rotary movements of the driving member are transmitted to the driven member and a second condition in which the driven member is maintained stationary, the drive means being such that whatever phase the driven member has with respect to the driving member when the drive means moves from the first condition to the second condition, the driven member will have the same phase with respect to the driving member when the drive means returns to the first condition, so that when stepwise rotary movement of the driven member is recommenced, it is still in phase with the driving member.

BRIEF DESCRIPTION OF THE DRAWINGS

By way of example, a specific embodiment of the invention will now be described, with reference to the accompanying drawings, in which.

DESCRIPTION OF THE PREFERRED EMBODIMENT

Figure 1:
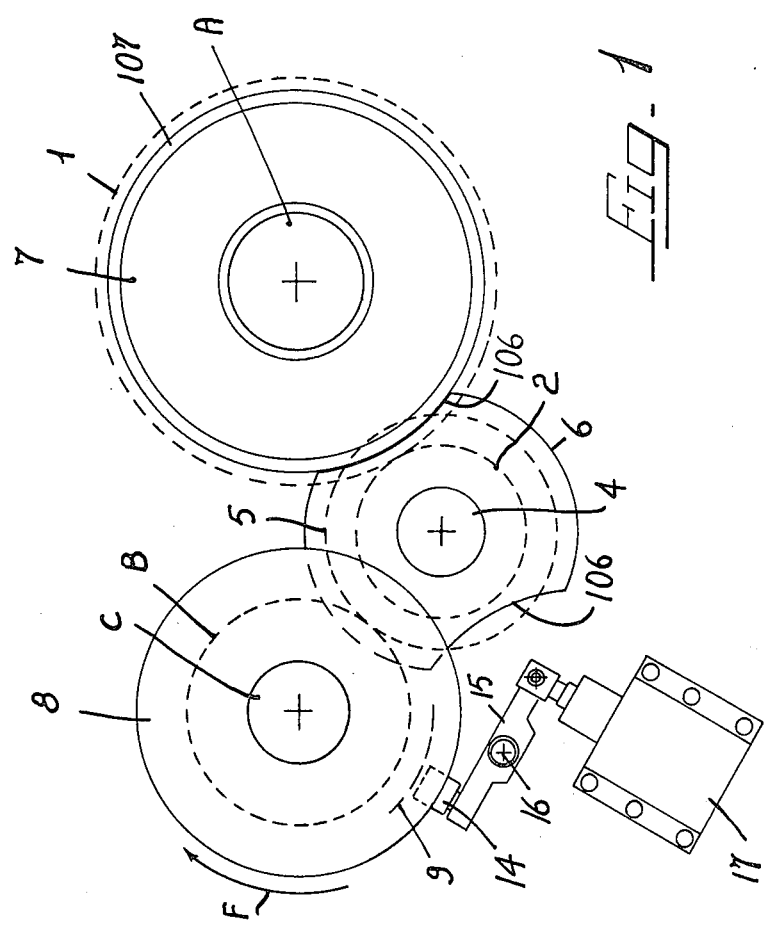
FIG. 1 is a diagrammatic view in front elevation of an embodiment of mechanism to which the invention relates, seen in the state of intervention.
Figure 2:
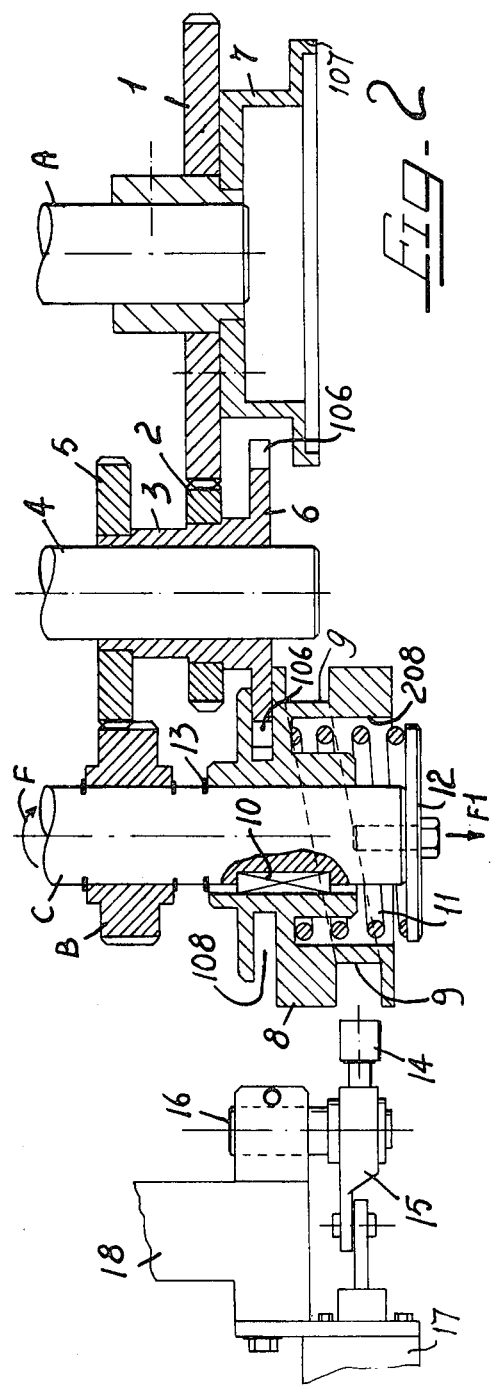
FIG. 2 and 3 illustrate the mechanism as seen from above, with the various components disposed all in one plane and partly in section; the mechanism is shown in the state of rest and in the state of intervention respectively.

Referring first to FIGS. 1 and 2 it is to be noted that A is the shaft to which stepwise rotary movement is imparted and B is the wheel of the mechanism which on command must be coupled and uncoupled in phase with the aforesaid shaft. The invention proposes the following solution of this problem. A toothed wheel 1 keyed on the shaft A normally meshes with a toothed wheel 2 of suitable diameter keyed on a sleeve 3 rotatable and axially slidable on a shaft 4 parallel to A. A second toothed wheel 5 of suitable diameter keyed on the same sleeve 3 meshes permanently with the toothed wheel B mounted rotatably on a shaft C parallel to 4 and to A.

The front face of the sleeve 3 is that of a disc 6 integral and coaxial with the sleeve and having on its periphery two equal recesses 106 in positions diametrically opposite one another and in the form of circular segments. The number of these recesses depends on the ratio existing between the wheels 1 and 2; in the case in question that is exactly 1 to 2. If this ratio is changed the number of angularly equidistant recesses 106 is changed proportionally. In the case considered with reference to FIGS. 1 and 2, during each quarter turn of the wheel 1 one of the recesses 106 is located in a position of concentricity with respect to the shaft A and therefore with respect to the annular collar 107 of a kind of cylindrical bell 7 fixed to the front face of the wheel 1 and coaxial with A. The external radius of curvature of the collar 107 is substantially equal to or slightly shorter than the radius of curvature of the recesses 106 of the disc 6, because in one of the phases of operation of the mechanism considered the two parts 107 and 106 have to be able to co-operate with one another without excessive clearance and as described hereinafter.

With further reference to FIG. 1 and more particularly to FIG. 2 it is to be noted that the disc 6 rotates freely in an annular slot 108 formed in the body of a drum cam 8 provided with a groove 9 having a suitable profile.

The cam in question is keyed to the shaft C by means of a key 10 and can slide axially on that shaft against the action of a cylindrical helical spring 11 which is accommodated in the front seating 208 of the cam body and which operates by abutting against a disc 12 fixed to the end of the shaft C. The spring 11 urges the cam 8 against abutment means 13 disposed on the shaft C, to keep this cam in the state shown in FIG. 2 corresponding to intermeshing of the wheels 1 and 2.

The shaft C together with the cam 8 rotate continuously for instance in the direction indicated by the arrow F. The speed of rotation of this shaft and the profile of the groove 9 of the cam 8 are functions which must be selected in suitable relationship with the speed of stepwise rotation of the shaft A and with the time of the periodic stoppages of that shaft.

The mechanism in question is completed by a roller 14 located opposite the cam 8 and aligned with the most outward part of the groove 9 of this cam. The roller 14 is rotatably monted on the end of a lever 15 which in turn is pivoted on a fixed shaft 16 parallel to C. The other end of the lever 15 is connected to the movable assembly of an electromagnet 17 or other suitable actuating means fixed to the same support 18 which carries the shaft 16.

The mechanism designed in this way operates in the following manner.

Normally the mechanism is in the state shown in FIG. 2, the electromagnet 17 is de-energised, the shaft A transmits the correct stepwise rotation to the wheel B through the intermediary of the gearing 1-2-5 and the shaft C and the cam 8 rotate continuously at the correct speed.

When it is necessary to stop the wheel B in phase with the shaft A, suitable control means, which are not illustrated because they can be readily envisaged by persons skilled in the art, effect energisation of the electromagnet 17 causing the roller 14 to move towards the cam 8. In correct phase the roller 14 enters the groove 9 of the cam (see FIG. 1) and causes this cam to make an axial movement of the correct amplitude and at the correct speed and with suitable stationary periods at the end of each stroke.

Figure 3:
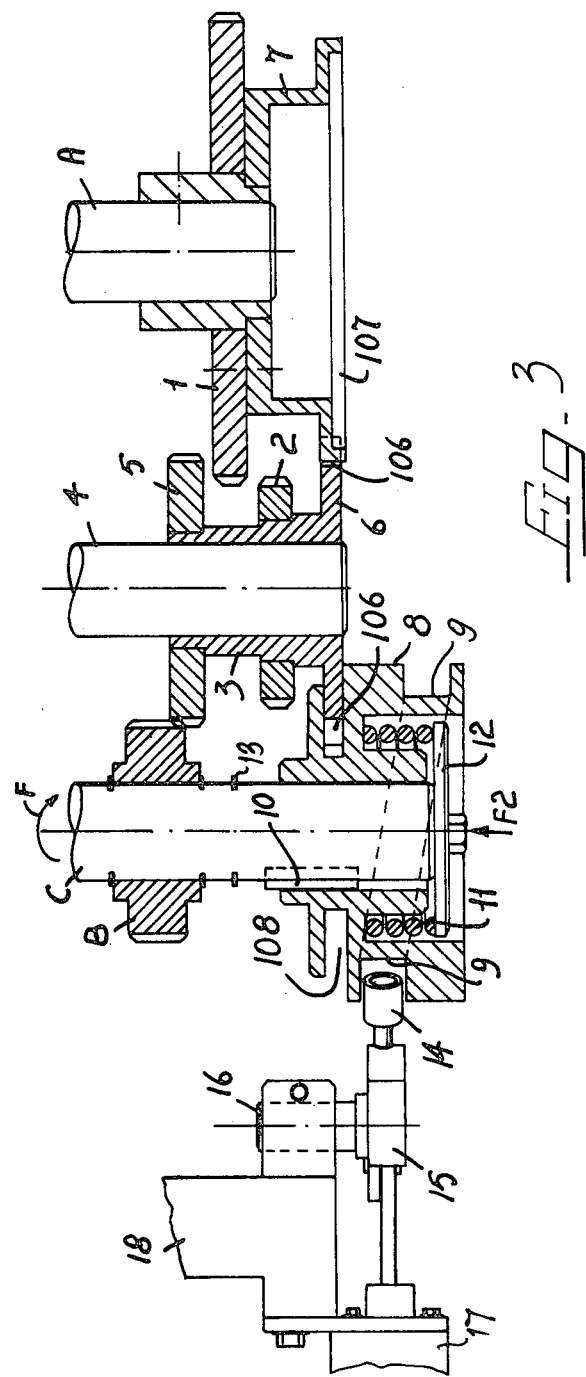

When the cam 8 is displaced in the direction indicated by the arrow F1 (see FIG. 2), the cam takes the parts 3, 5 and 6 with it and the whole assembly is brought into the state shown in FIG. 3. In correct phase with this displacement the shaft A stops, and before the wheel 2 is completely disengaged from the wheel 1 a recess 106 of the disc 6, which is located concentrically with A, begins its co-operation with the collar 107 of the cylindrical bell 7. In this way, the wheel B which is still meshing with the wheel 5 and is prevented from rotation by the co-operation of the parts 106 and 107, is now stopped in phase with the shaft A as required.

Then, when the wheel 2 is completely disengaged from the wheel 1 the shaft A can begin to rotate again in correct phase.

When the cam 8 is displaced in the opposite direction shown by the arrow F2 (FIG. 3), the mechanism is successively returned to the state shown in FIG. 2 while the roller 14 remains in the groove 19 of the cam. At the correct instant before the wheel 2 engages the wheel 1, the shaft A stops while the parts 106 and 107 are still co-operating with one another. The wheel 2 again engages and meshes in phase with the wheel 1, while the disc 6 moves completely clear of the collar 107. If the wheel B has to remain stationary, the cycle is repeated in the way described, while the electromagnet 17 remains energised. If on the other hand the wheel B has to be recoupled to the shaft A, then when the mechanism is in the state shown in FIG. 2 or at any time when the wheel 2 is meshing with the wheel 1, de-energisation of the electromagnet 17 is effected, in correct phase, so that the roller 14 is withdrawn from the groove of the cam.

The mechanism thus remains in the state shown in FIG. 2 and the stepwise rotary movement is successively imparted to the wheel B from the shaft A.

It will be understood that design details regarding the profile of the groove 9 of the cam, the control circuit for energizing and de-energizing the electromagnet 17 in phase and also the support structure of the various members, have been omitted from the discription, because all of these can be readily devised and easily constructed by a person skilled in the art.

It will also be understood that the description has concerned a preferred embodiment of the invention, in which numerous variations and modifications can be made, more particularly as regards design. The nature of these variations may for instance be such that the various components of the mechanism are mounted otherwise than has been described and illustrated, or that some components are replaced by others having an equivalent function. It would for instance be possible to eliminate the disc 6 and the bell 7 and replace them by fixed means mounted for instance on the shaft 4 and adapted to engage the teeth of the toothed wheel 2 directly when this wheel is disengaged from the wheel 1.

These and other variants and possibilities which also can be readily devised by persons skilled in the art are not outside the scope of the invention as disclosed above, as illustrated and as claimed hereinafter.

I claim:

1. Apparatus for controlling in phase coupling and uncoupling of a kinematic mechanism with respect to another such mechanism to which intermittent rotary movement is imparted, comprising:
   (a) a driving member including a driving shaft and a locking member having a locking wheel rigidly fixed to the driving shaft, and locking wheel having a substantially continuous smooth rim;
   (b) a driven member including a toothed wheel, said driven member being controlled for in phase movement relative to said driving member; and
   (c) control means for interconnecting the driving member and driven member, said control means including a control member having a control wheel with at least one recess formed in a rim thereof and a sleeve carrying first and second toothed wheels, said control wheel rigidly fixed to the sleeve, said control means being moveable between first and second positions wherein intermittent rotary movement of the driving member is transmitted through the control means to the driven member in the first position, said driven member being maintained stationary in said second position, whereby said control means maintains in phase relationship between the driven member and the driving member when the control means moves from first position to second position to enable the driven member to have the same phase relative to the driving member when said control means returns to first position and intermittent rotary movement of the driven member is recommenced, said control member engaging the locking member when said control means moves to second position to thereby prevent rotation of the control means and driven member, said control member capable of engaging the locking member only when the control means has a predetermined rotational orientation relative to said locking member, said sleeve being axially slidable between the first and second positions, said first toothed wheel being permanently in mesh with the driven member and the second toothed wheel meshes with the toothed wheel on the driving member in said first position and disengages therefrom in said second position and disengages therefrom in said second position; said control wheel and locking wheel positioned to overlap to thereby enable a recess of the control wheel located in a predetermined position to engage the locking wheel, said locking wheel being able to rotate but said control wheel being prevented from rotation by engagement of the locking wheel rim with the recess.

2. Apparatus for controlling in phase coupling and uncoupling of a kinematic mechanism with respect to another such mechanism to which intermittent rotary movement is imparted, comprising:

a driving member including a driving shaft, to which intermittent rotary movement is imparted;

a driven member including a shaft, said driven member being controlled for selective in phase movement relative to said driving member, said driving and driven shafts being substantially parallel to each other; and control means for operatively interconnecting the driving member and driven member, said control means being movable between first and second positions, whereby intermittent rotary movement of the driving member is transmitted through the control means to the driven member in the first position, said driven member being maintained stationary in said second position, said control means carried on a shaft substantially parallel to said driving and driven shafts, whereby said control means maintains in phase relationship between the driven member and the driving member when the control means moves from first position to second position, thereby enabling the driven member to have the same phase relative to the driving member when said control means returns to the first position and intermittent rotary movement of the driven member is recommenced.

3. Apparatus as claimed in claim 2, wherein said control means includes a control member and said driving member includes a locking member engaging the control member when said control means moves to second position, thereby preventing rotation of the control means and driven member.

4. Apparatus as claimed in claim 3, wherein said control member is capable of engaging the locking member only when the control means has a predetermined rotational orientation relative to said locking member.

5. Apparatus as claimed claim 4, wherein said driven member includes a toothed wheel.

6. Apparatus as claimed in claim 5, wherein said control means comprises a sleeve (3) a first intermediate toothed wheel rigidly secured thereto, and a second intermediate toothed wheel, said sleeve being axially movable between the first and second positions, and said driving member includes a toothed wheel keyed to the driving shaft, whereby said first intermediate toothed wheel is permanently in mesh with the driven member and the second intermediate toothed wheel meshes with the toothed wheel of the driving member in said first position and disengages therefrom in said second position.

7. Apparatus as claimed in claim 6, wherein said control member comprises a control wheel rigidly fixed to the sleeve, and the locking member comprises a locking wheel rigidly fixed to the driving shaft, said locking wheel having a substantially continuous smooth rim and said control wheel having one or more recesses (106) in its rim, said control wheel and locking wheel positioned to overlap to thereby enable a recess of the control wheel in a predetermined position to engage the locking wheel, said locking wheel being able to rotate but said control wheel being prevented from rotation by engagement of the rim of the locking wheel in the recess.

8. Apparatus as claimed in claim 7 or 1, wherein said recess engages the locking wheel when said sleeve moves axially from first position to second position before the second toothed wheel disengages the toothed wheel keyed to the driving shaft, whereby movement of the first position to the second position occurs when the driven shaft is stationary.

9. Apparatus as claimed in claim 8 wherein movement of the control means between the first and second positions occurs axially, said movement being controlled by a cam mounted for rotation about an axis substantially parallel to the axis of the driving and driven members, the cam being connected to the drive means for axial movement therewith, the cam and hence the control means being resiliently urged into the first position.

10. Apparatus as claimed in claim 9, in which the cam is controlled by a cam follower (14) which, when moved into the path of the cam, acts on the cam to move the driving means between the first and second conditions.

11. Apparatus as claimed in claim 10, in which the cam follower can be moved into the path of the cam when desired by means of an electromagnet.

12. Apparatus as claimed in claim 10, in which the cam follower comprises a roller mounted on a lever.

13. Apparatus as claimed in claim 9, in which the cam is a driven cam.

* * * * *